United States Patent
Decarreau (10) Patent No.: US 12,395,975 B2
(45) Date of Patent: Aug. 19, 2025

(54) FIRST AND SECOND APPARATUS, METHOD TO OPERATE THE FIRST AND SECOND APPARATUS

(71) Applicant: Nokia Technologies Oy, Espoo (FI)

(72) Inventor: Guillaume Decarreau, Munich (DE)

(73) Assignee: NOKIA TECHNOLOGIES OY, Espoo (FI)

(*) Notice: Subject to any disclaimer, the term of this patent is extended or adjusted under 35 U.S.C. 154(b) by 429 days.

(21) Appl. No.: 17/907,416

(22) PCT Filed: Apr. 6, 2020

(86) PCT No.: PCT/EP2020/059756
§ 371 (c)(1),
(2) Date: Sep. 27, 2022

(87) PCT Pub. No.: WO2021/204346
PCT Pub. Date: Oct. 14, 2021

(65) Prior Publication Data
US 2023/0117326 A1 Apr. 20, 2023

(51) Int. Cl.
*H04W 72/044* (2023.01)
*H04W 72/0457* (2023.01)

(52) U.S. Cl.
CPC ..... *H04W 72/046* (2013.01); *H04W 72/0457* (2023.01)

(58) Field of Classification Search
None
See application file for complete search history.

(56) References Cited

U.S. PATENT DOCUMENTS

| | | | |
|---|---|---|---|
| 2019/0296882 A1 | 9/2019 | Li et al. | |
| 2019/0305840 A1* | 10/2019 | Cirik | H04W 72/0453 |
| 2021/0204288 A1* | 7/2021 | Ji | H04W 72/0453 |
| 2021/0377929 A1* | 12/2021 | Li | H04L 5/0082 |
| 2022/0022065 A1* | 1/2022 | Wang | H04W 24/08 |

(Continued)

FOREIGN PATENT DOCUMENTS

| | | |
|---|---|---|
| CN | 110447175 A | 11/2019 |
| TW | 201937873 A | 9/2019 |

(Continued)

OTHER PUBLICATIONS

"3rd Generation Partnership Project; Technical Specification Group Radio Access Network; NR; NR and NG-RAN Overall Description; Stage 2 (Release 16)", 3GPP TS 38.300, V16.0.0, Dec. 2019, pp. 1-101.

(Continued)

*Primary Examiner* — Phirin Sam
(74) *Attorney, Agent, or Firm* — Lippes Mathias LLP (57) ABSTRACT

There is provided a method to operate a first apparatus, the method comprising: determining a beam indicator that indicates at least one radio beam; determining a bandwidth part indicator that indicates at least one bandwidth part; determining a resource status indicator that indicates at least one status of radio resources, that are associated with the at least one radio beam and associated with the at least one bandwidth part; and transmitting at least one resource status set comprising the determined beam indicator, the determined bandwidth part indicator and the determined resource status indicator.

11 Claims, 4 Drawing Sheets

(56) References Cited

U.S. PATENT DOCUMENTS

| | | | | |
|---|---|---|---|---|
| 2022/0407582 A1* | 12/2022 | Awad | ............... | H04W 76/19 |
| 2023/0142247 A1* | 5/2023 | Turtinen | ............... | H04W 24/10 |
| | | | | 370/329 |
| 2023/0309131 A1* | 9/2023 | Farag | ............... | H04L 5/0094 |
| 2024/0314767 A1* | 9/2024 | Zhang | ............... | H04W 72/1263 |

FOREIGN PATENT DOCUMENTS

| | | | |
|---|---|---|---|
| WO | 2019/195528 A1 | 10/2019 | |
| WO | 2019/243449 A2 | 12/2019 | |
| WO | 2020/057979 A1 | 3/2020 | |
| WO | 2020/064229 A1 | 4/2020 | |
| WO | 2020/064333 A1 | 4/2020 | |
| WO | 2020/167198 A1 | 8/2020 | |

OTHER PUBLICATIONS

"3rd Generation Partnership Project; Technical Specification Group Radio Access Network; Evolved Universal Terrestrial Radio Access Network (E-UTRAN); X2 application protocol (X2AP) (Release 16)", 3GPP TS 36.423, V16.0.0, Dec. 2019, pp. 1-432.

"[TP for BL CR to TS 38.423] Addition of Load Sharing and Load Balancing Optimisation", 3GPP TSG-RAN WG3 Meeting #105, R3-194774, Agenda: 10.2.2, Nokia, Aug. 26-30, 2019, 10 pages.

"Addition of SON features", 3GPP TSG-RAN WG3 #107, R3-20xxxx, Samsung, Feb. 24-28, 2020, 135 pages.

"3rd Generation Partnership Project; Technical Specification Group Radio Access Network; NR; Radio Resource Control (RRC) protocol specification (Release 15)", 3GPP TS 38.331, V15.8.0, Dec. 2019, pp. 1-532.

"3rd Generation Partnership Project; Technical Specification Group Radio Access Network; NG-RAN; Xn application protocol (XnAP) (Release 16)", 3GPP TS 38.423, V16.0.0, Dec. 2019, pp. 1-330.

International Search Report and Written Opinion received for corresponding Patent Cooperation Treaty Application No. PCT/EP2020/059756, dated Oct. 16, 2020, 19 pages.

Extended European Search Report received for corresponding European Patent Application No. 21166252.3, dated May 14, 2021, 15 pages.

Office action received for corresponding European Patent Application No. 21166252.3, dated Jun. 22, 2023, 15 pages.

Office action received for corresponding Chinese Patent Application No. 202080099395.9, dated Feb. 27, 2025, 10 pages of office action and no page of translation available.

* cited by examiner

Fig. 4

FIRST AND SECOND APPARATUS, METHOD TO OPERATE THE FIRST AND SECOND APPARATUS

RELATED APPLICATION

This application was originally filed as PCT Application No. PCT/EP2020/059756, filed on Apr. 6, 2020, which is incorporated herein by reference in its entirety.

FIELD OF THE INVENTION

Various example embodiments relate to enhancements for radio communication networks.

BACKGROUND

A Bandwidth Part (BWP) in radio communication networks is a set of contiguous Common Resource Blocks within the bandwidth of the cell.

SUMMARY

A first aspect of the description is directed to a first apparatus comprising at least one processor, at least one memory including computer program code, and at least one communication module, the at least one memory and computer program code configured, with the at least one processor, and the at least one communication module, to cause the first apparatus at least to: determine a beam indicator that indicates at least one radio beam; determine a bandwidth part indicator that indicates at least one bandwidth part; determine a resource status indicator that indicates at least one status of radio resources, that are associated with the at least one radio beam and associated with the at least one bandwidth part; and transmit at least one resource status set comprising the determined beam indicator, the determined bandwidth part indicator and the determined resource status indicator.

The load is signaled per radio beam and per BWP. Advantageously, the resource status set allows exploiting the spectral dimension and the spatial dimension of shared radio resource usage. The provision of the beam indicator and the bandwidth part indicator allow an adaption of the use of the radio resources at the receiver side.

For example, intra-cell mobility is increased. Intra-cell beam switching is transparent and seamless from the UE perspective. Therefore, the problem of intra-cell load balancing is mitigated. The UE is instructed to generate periodic CSI reports to the serving entity. The UE monitors the set of CSI reference signals of the beams and reports the identity of at least one of the beams in combination with an RSRP, Reference Signal Received Power, measurement. The first apparatus according to claim 1, wherein the beam indicator comprises a Synchronization Signal Block, SSB, index.

Advantageously, the reporting may use the SSB index as reference for the identification of the beam.

According to an advantageous example, the bandwidth part indicator comprises at least one of: an information about the location of the bandwidth part in frequency, a bandwidth part identifier per cell, a Physical Cell Identifier, PCI, and an Absolute Radio-Frequency Channel Number, ARFCN.

The BWP can then be indexed by the PCI/ARFCN of a corresponding SSB and/or a bandwidth part identifier per cell that is introduced for this purpose.

In particular a plurality, for example two, ARFCNs are provided. This is the case, when a BWP is indicated by the lower and upper frequency.

The bandwidth part identifier provides a grouping of the UE defined BWP into Cell defined BWP.

According to a second aspect of the description a second apparatus is provided, the second apparatus comprising at least one processor, at least one memory including computer program code, and at least one communication module, the at least one memory and computer program code configured, with the at least one processor, and the at least one communication module, to cause the second apparatus at least to: receive at least one resource status set comprising a first beam indicator, a first bandwidth part indicator and a first resource status indicator; and manage second radio resources being operated by the second apparatus in dependence on the received at least one resource status set.

The load is signaled per radio beam and per BWP. Advantageously, the resource status set allows exploiting the spectral dimension and the spatial dimension of shared radio resource usage. The provision of the beam indicator and the bandwidth part indicator allow an adaption of the use of the radio resources at the receiver side.

For example, intra-cell mobility is increased. Intra-cell beam switching is transparent and seamless from the UE perspective. Therefore, the problem of intra-cell load balancing is mitigated. The UE is instructed to generate periodic CSI reports to the serving entity. The UE monitors the set of CSI reference signals of the beams and reports the identity of at least one of the beams in combination with an RSRP, Reference Signal Received Power, measurement.

According to an advantageous example, the first beam indicator comprises a Synchronization Signal Block, SSB, index.

Advantageously, the reporting may use the SSB index as reference for the identification of the beam.

According to an advantageous example, the bandwidth part indicator comprises at least one of: an information about the location of the bandwidth part in frequency, a bandwidth part identifier per cell, a Physical Cell Identifier, PCI, and an Absolute Radio-Frequency Channel Number, ARFCN.

The BWP can then be indexed by the PCI/ARFCN of a corresponding SSB and/or a bandwidth part identifier per cell that is introduced for this purpose.

According to an advantageous example, the second apparatus is further configured to: determine a second resource status indicator that indicates at least one status of second radio resources, which are operated by the second apparatus, wherein said second radio resources are associated with a second radio beam and associated with the at least one first bandwidth part, wherein the at least one second radio beam and the at least one first bandwidth part are operated by the second apparatus; and manage the second radio resources being operated by the second apparatus in dependence on the received first resource status indicator and in dependence on the determined second resource status indicator.

Advantageously, the management of the second resources is provided by incorporating the received first resource status indicator and the second resource status indicator, wherein both resource indicators represent a radio domain situation in space and frequency.

According to an advantageous example, the second apparatus is further configured to: determine a spatial overlap between at least one first beam, which is identified via the received first beam indicator, and the at least one second and/or at least one third radio beam, which is operated by the second apparatus; manage the second radio resources being operated by the second apparatus in dependence on the determined spatial overlap.

Advantageously, the spatial overlap allows exploiting the spatial radio domain by managing the second radio resources appropriately.

According to an advantageous example, the second apparatus is configured to: determine a high congestion situation in the spatial overlap for the at least one first bandwidth part indicated by the first bandwidth part indicator, de-allocate at least a part of the second radio resources that are associated with the first bandwidth part and associated with the at least one second radio beam, which is subject to the determined spatial overlap.

Advantageously, the resources of the first bandwidth part are released, if the high congestion situation is indicated by a neighboring apparatus. For example, a UE may be handed over to the second apparatus by using a bandwidth part different from the first bandwidth part.

According to an advantageous example, the second apparatus is further configured to: allocate third radio resources, which are operated by the second apparatus, in dependence on the high congestion situation, wherein the third radio resources are associated with the at least third radio beam and associated with a second bandwidth part operated by the second apparatus.

Advantageously, the third radio resources allow to handover a UE to the second apparatus and to serve the UE via the third radio resources. In yet another example, a UE being already served by the second apparatus may be switched to use the third radio resources instead of the second radio resources in order to balance the load in the available spectrum.

According to an advantageous example, the second apparatus is further configured to: determine a low congestion situation in the determined spatial overlap for the first bandwidth part indicated by the first bandwidth part indicator, allocate at least a part of the second radio resources that are associated with the first bandwidth part and associated with the at least one second radio beam, which is subject to the determined spatial overlap.

According to an advantageous example, the second apparatus is further configured to: de-allocate fourth radio resources, which are operated by the second apparatus, in dependence on the low congestion situation, wherein the fourth radio resources are associated with the at least one third radio beam and associated with a second bandwidth part operated by the second apparatus.

According to a third aspect of the description a method to operate a first apparatus is provided, the method comprising: determining a beam indicator that indicates at least one radio beam; determining a bandwidth part indicator that indicates at least one bandwidth part; determining a resource status indicator that indicates at least one status of radio resources, that are associated with the at least one radio beam and associated with the at least one bandwidth part; and transmitting at least one resource status set comprising the determined beam indicator, the determined bandwidth part indicator and the determined resource status indicator.

A fourth aspect of the description relates to a method to operate a second apparatus, the method comprising: receiving at least one resource status set comprising a first beam indicator, a first bandwidth part indicator, and a first resource status indicator; and managing second radio resources being operated by the second apparatus in dependence on the received at least one resource status set.

A fifth aspect of the description is directed to a first apparatus, the first apparatus comprising: determining means to determine a beam indicator that indicates at least one radio beam; determining means to determine a bandwidth part indicator that indicates at least one bandwidth part; determining means to determine a resource status indicator that indicates at least one status of radio resources, that are associated with the at least one radio beam and associated with the at least one bandwidth part; and transmitting means to transmit at least one resource status set comprising the determined beam indicator, the determined bandwidth part indicator and the determined resource status indicator.

According to an example, the beam indicator comprises a Synchronization Signal Block, SSB, index.

According to an example, the bandwidth part indicator comprises at least one of: an information about the location of the bandwidth part in frequency, a bandwidth part identifier per cell, a Physical Cell Identifier, PCI, and an Absolute Radio-Frequency Channel Number, ARFCN.

According to a sixth aspect of this description a second apparatus is provided, the second apparatus comprising: receiving means to receive at least one resource status set comprising a first beam indicator, a first bandwidth part indicator, and a first resource status indicator; and managing means to manage second radio resources being operated by the second apparatus in dependence on the received at least one resource status set.

According to an example, the first beam indicator comprises a Synchronization Signal Block, SSB, index.

According to an example, the bandwidth part indicator comprises at least one of: an information about the location of the bandwidth part in frequency, a bandwidth part identifier per cell, a Physical Cell Identifier, PCI, and an Absolute Radio-Frequency Channel Number, ARFCN.

According to an example, the second apparatus comprises: determining means to determine a second resource status indicator that indicates at least one status of second radio resources, which are operated by the second apparatus, wherein said second radio resources are associated with a second radio beam and associated with the at least one first bandwidth part, wherein the at least one second radio beam and the at least one first bandwidth part are operated by the second apparatus; and managing means to manage the second radio resources being operated by the second apparatus in dependence on the received first resource status indicator and in dependence on the determined second resource status indicator.

According to an example, the second apparatus further comprises: determining means to determine a spatial overlap between at least one first beam, which is identified via the received first beam indicator, and the at least one second and/or at least one third radio beam, which is operated by the second apparatus; and managing means to manage the second radio resources being operated by the second apparatus in dependence on the determined spatial overlap.

According to an example, the second apparatus further comprises: determining means to determine a high congestion situation in the spatial overlap for the at least one first bandwidth part indicated by the first bandwidth part indicator; and de-allocating means to de-allocate at least a part of the second radio resources that are associated with the first bandwidth part and associated with the at least one second radio beam, which is subject to the determined spatial overlap.

According to an example, the second apparatus further comprises: allocating means to allocate third radio resources, which are operated by the second apparatus, in dependence on the high congestion situation, wherein the third radio resources are associated with the at least third radio beam and associated with a second bandwidth part operated by the second apparatus.

According to an example, the second apparatus further comprises: determining means to determine a low congestion situation in the determined spatial overlap for the first bandwidth part indicated by the first bandwidth part indicator; and allocating means to allocate at least a part of the second radio resources that are associated with the first bandwidth part and associated with the at least one second radio beam, which is subject to the determined spatial overlap.

According to an example, the second apparatus further comprises: de-allocating means to de-allocate fourth radio resources, which are operated by the second apparatus, in dependence on the low congestion situation, wherein the fourth radio resources are associated with the at least one third radio beam and associated with a second bandwidth part operated by the second apparatus.

BRIEF DESCRIPTION OF THE FIGURES

Some example embodiments will now be described with reference to the accompanying drawings.

DETAILED DESCRIPTION

Figure 1:
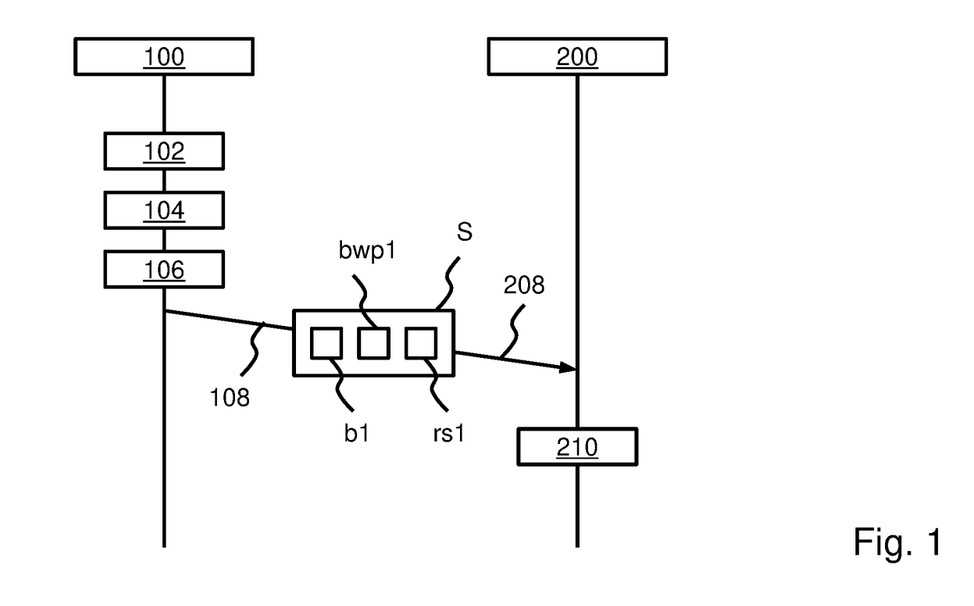
FIGS. 1 and 3 each schematically depict a sequence diagram to operate a first and second apparatus.

FIGS. 1 schematically depicts a sequence diagram to operate a first and second apparatus 100, 200.

The first apparatus 100, for example a first next generation NodeB, determines according to a processing module or determining means 102 a beam indicator b1 that indicates at least one radio beam, which is operated by the first apparatus 100. The first apparatus determines according to a processing module or determining means 104 a bandwidth part indicator bwp1 that indicates at least one bandwidth part, which is operated by the first apparatus 100. The first apparatus 100 determines according to a processing module or determining means 106 a resource status indicator rs1 that indicates at least one status, for example a load or occupancy information, of radio resources, that are associated with the at least one radio beam and associated with the at least one bandwidth part. The first radio apparatus 108 comprises transmitting means or a processing module 108 to transmit at least one resource status set S comprising the determined beam indicator b1, the determined bandwidth part indicator bwp1 and the determined resource status indicator rs1. The at least one resource status set S is part of a resource status update or of an Xn setup request or of an Xn setup response.

The second apparatus 200, for example a second next generation NodeB gNB, receives, via a processing module or a receiving means 208, the at least one resource status set S, for example as part of a resource status update or of a Xn setup request or of a Xn setup response, comprising the first beam indicator b1, which indicates at least one first radio beam, which is operated by the first apparatus 100, the first bandwidth part indicator bwp1, which indicates at least one bandwidth part that is operated by the first apparatus 100 and the first resource status indicator rs1, which indicates at least one status of first radio resources being associated with the at least one first radio beam and being associated with the at least one first bandwidth part. The second apparatus 200 comprises a processing module or managing means 210 to manage second radio resources being operated by the second apparatus 200 in dependence on the received at least one resource status set S.

A bandwidth part is a set of contiguous Common Resource Blocks, in particular within the bandwidth of the cell. A bandwidth part can include all or some Common Resource Blocks within the channel bandwidth, or a subset of Common Resource Blocks.

With Bandwidth Adaptation, BA, the receive and transmit bandwidth of a UE can be adjusted: the width can be ordered to change e.g. to shrink during period of low activity to save power; the location can move in the frequency domain e.g. to increase scheduling flexibility; and the subcarrier spacing can be ordered to change e.g. to allow different services. A subset of the total cell bandwidth of a cell is referred to as a Bandwidth Part, BWP, and BA is achieved by configuring the UE with BWPs and telling the UE which of the configured BWPs is currently the active one. Therefore, besides the initial BWP of the cell, a plurality of BWPs can be active in a cell.

According to an example, the report of the load of a cell, in particular in form of the resource status indicator rs1, is divided into several bandwidth parts, BWPs and into several radio beams. When the load of a cell is signaled, it can be done per BWP within a cell.

According to an example, the first apparatus 100, in particular in form of a next generation distributed unit, gNB, provides a list of BWPs to a controlling gnB-CU, the second apparatus 200, when a F1 connection is established, wherein at least one BWP is referenced by an identifier.

According to an example, the first apparatus 100, in particular in form of a gNB, provides a list of BWPs for each Cell it controls to its neighbor gnB, the second apparatus 200, when an Xn connection is established, wherein at least one BWP is referenced by an identifier. The BWP can then be referenced by its identifier in the Load Reporting message.

The beam design in at least one BWP can be defined freely. In addition, the beam design can be different in different BWPs. The initial BWP comprises CD-SSB and RMSI. Further BWPs are configured per UE. UE communicates with the network using one or more BWP. The cell comprises a plurality of BWPs. It is also possible that a gNB uses the BWP parameters affecting a plurality of UEs, in this case, we continue to use the term BWP. This means that this BWP will be used and configured to different UEs.

According to an example, the beam indicator b1 comprises a Synchronization Signal Block, SSB, index. Therefore, when the load of the cell is signaled to the second apparatus 200, for example the neighbor gNB, the load is split into several BWP. For at least one BWP the information contains at least the location of the BWP in frequency in the carrier.

According to an example, the bandwidth part indicator bwp1 comprises at least one of:

An information about the location of the bandwidth part in frequency, in particular in the carrier frequency. The location of the bandwidth part BWP in frequency can be also referred to as a subcarrier or a subcarrier frequency.

A bandwidth part identifier per cell.

A Physical Cell Identifier, PCI.

An Absolute Radio-Frequency Channel Number, ARFCN.

According to an example, the first beam indicator b1 comprises a Synchronization Signal Block, SSB, index.

The RESOURCE STATUS UPDATE in form of a message, in particular comprising the set S, is sent by NG-RAN $node_2$ to neighbouring NG-RAN $node_1$ to report the results of the requested measurements, direction: NG-RAN $node_2 \rightarrow$ NG-RAN $node_1$. The resource status update comprises information as exemplified in table 1. The NG-RAN $node_2$ shall report the results of the admitted measurements in RESOURCE STATUS UPDATE message. The admitted measurements are the measurements that were successfully initiated during the preceding Resource Status Reporting Initiation procedure, and thus not reported in the Measurement Failed Report Characteristics IE for the concerned cell in the RESOURCE STATUS RESPONSE message.

Accordingly, the set S further comprises at least one of the entries of table 1.

TABLE 1

| IE/Group Name | Presence | Range | IE type and reference | Semantics description |
|---|---|---|---|---|
| Message Type | M | | 9.2.3.1 | |
| NG-RAN node1 Measurement ID | M | | INTEGER (1 . . . 4095, . . .) | Allocated by NG-RAN $node_1$ |
| NG-RAN node2 Measurement ID | M | | INTEGER (1 . . . 4095, . . .) | Allocated by NG-RAN $node_2$ |
| Hardware Load Indicator | O | | 9.2.2.ww | |
| Cell Measurement Result | | 1 | | |
| >Cell Measurement Result Item | | 1 . . . < maxnoofCellsinNG-RANnode > | | |
| >>Cell ID | M | | 9.2.3.25 | |
| >>Cell-BWP Measurement | O | 1 . . . < max-Cell-BWP > | | List of BWP of the cell |
| >>>Cell-BWP-ID | O | | INTEGER (0 . . . max-Cell-BWP-ID) | ID of the BWP in the cell |
| >>> BWP Lower frequency | O | | INTEGER (0 . . . maxNRARFCN | Lower frequency bound of the BWP |
| >>> BWP higher frequency | O | | INTEGER (0 . . . maxNRARFCN | Higher frequency bound of the BWP |
| >>> PCI of SSB | O | | INTEGER (0 . . . 1007) | Physical Cell ID of the SSB corresponding to the BWP |
| >>> ARFCN of SSB | O | | INTEGER (0 . . . maxNRARFCN) | Frequency of the SSB corresponding to the BWP |
| >>>Radio Resource Status | O | | 9.2.2.yy | |
| >>>Composite Available Capacity Group | O | | 9.2.2.zz | |
| >>NG TNL Load Indicator | O | | 9.2.2.xx | |
| >>Slice Available Capacity | O | | 9.2.2.jj | |
| >>Number of Active UEs | O | | INTEGER (1 . . . 65536, . . .) | |
| >> RRC Connections | O | | 9.2.2.kk | |

For example the set S comprises:
a NG-RAN node1 Measurement ID,
a NG-RAN node2 Measurement ID,
a Hardware Load Indicator,
a Cell Measurement Result.

The Cell Measurement Result comprises at least one Cell Measurement Result Item.

The slice(s) available on the BWP;
The type of service the BWP can serve (Voice, Data, etc. . . . );
The level of quality served in the BWP (5QI);
The SCS (Sub Carrier Spacing) of the BWP/SSB.

Accordingly, the set S further comprises at least one of the entries of table 2.

TABLE 2

| IE/Group Name | Presence | Range | IE type and reference | Semantics description | Criticality |
|---|---|---|---|---|---|
| NR-PCI | M | | INTEGER (0 . . . 1007, . . .) | NR Physical Cell ID | — |
| NR CGI | M | | 9.2.2.7 | | — |
| TAC | M | | 9.2.2.5 | Tracking Area Code | — |
| RANAC | O | | RAN Area Code 9.2.2.6 | | — |
| BWP List | O | 1 . . . < max-Cell-BWP > | | List of BWP of the cell | |
| >Cell-BWP-ID | O | | INTEGER (0 . . . max-Cell-BWP-ID) | ID of the BWP in the cell | |
| > BWP Lower frequency | O | | INTEGER (0 . . . maxNRARFCN | Lower bound frequency of the BWP | |
| > BWP higher frequency | O | | INTEGER (0 . . . maxNRARFCN | higher bound frequency of the BWP | |
| > PCI of SSB | O | | INTEGER (0 . . . 1007) | Physical Cell ID of the SSB corresponding to the BWP | |
| > ARFCN of SSB | O | | INTEGER (0 . . . maxNRARFCN) | Frequency of the SSB corresponding to the BWP | |

A Cell Measurement Result Item comprises at least:
a Cell ID,
one or more Cell-BWP measurements,
NG TNL Load Indicator.
A Cell-BWP measurement comprises at least:
a Cell-BWP-ID,
BWP Lower frequency,
BWP higher frequency,
PCI of SSB,
ARFCN of SSB,
Radio Resource Status, and
Composite Available Capacity Group.

According to another example, the list of BWP that the cell is using can be sent to neighbour gNB via Xn interface in Xn Setup procedure via an Xn Setup Request and/or an Xn Setup Response. A Served Cell Information NR comprises information as exemplified in table 2.

The position in frequency of the BWP could be also signalled with the IE "locationAndBandwidth" which is used for configuring a BWP to a UE in RRC Signalling.

Further indications added per BWP comprise at least one of the following:

For example the set S comprises:
a NR-PCI,
a NR CGI,
a TAC,
a RANAC,
a BWP List.
A BWP list comprises:
aCell-BWP-ID,
BWP Lower frequency,
BWP higher frequency,
PCI of SSB,
ARFCN of SSB.

Figure 2:
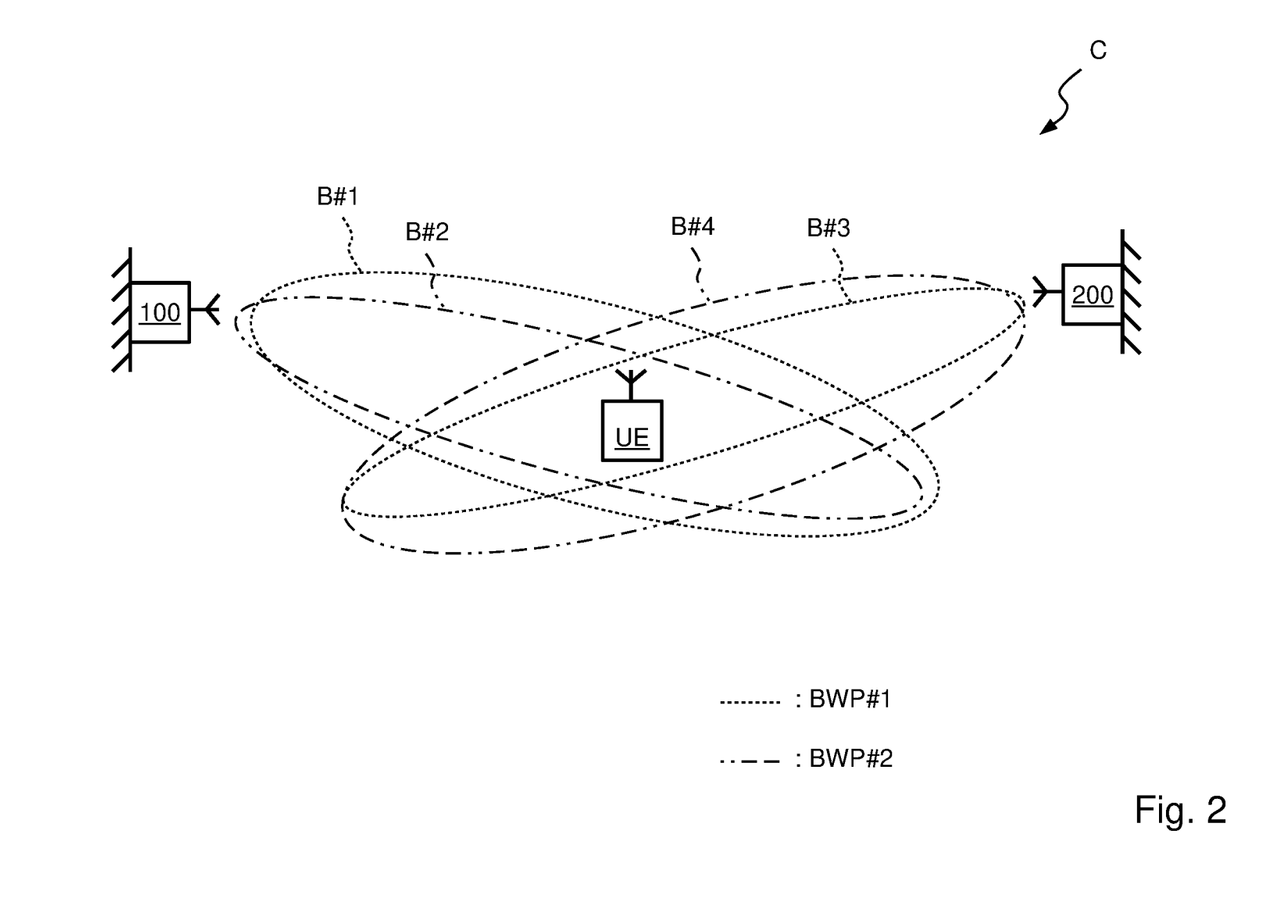
FIG. 2 schematically depicts an example of a cell served by the first and second apparatus.

FIG. 2 schematically depicts an example of a cell C, which is served by the first and second apparatus 100, 200. The UE resides at a location, where the beams B#1, B#2 provided by the first apparatus 100 and the beams B#3, B#4 provided by the second apparatus 200 overlap. So, given that the respective radio resources are not occupied, the UE can be served by at least one of the beams B#1 to B#4. The beams B#1 and B#3 are served via the bandwidth part BWP#1. The beams B#2 and B#4 are served via the bandwidth part BWP#2.

Figure 3:
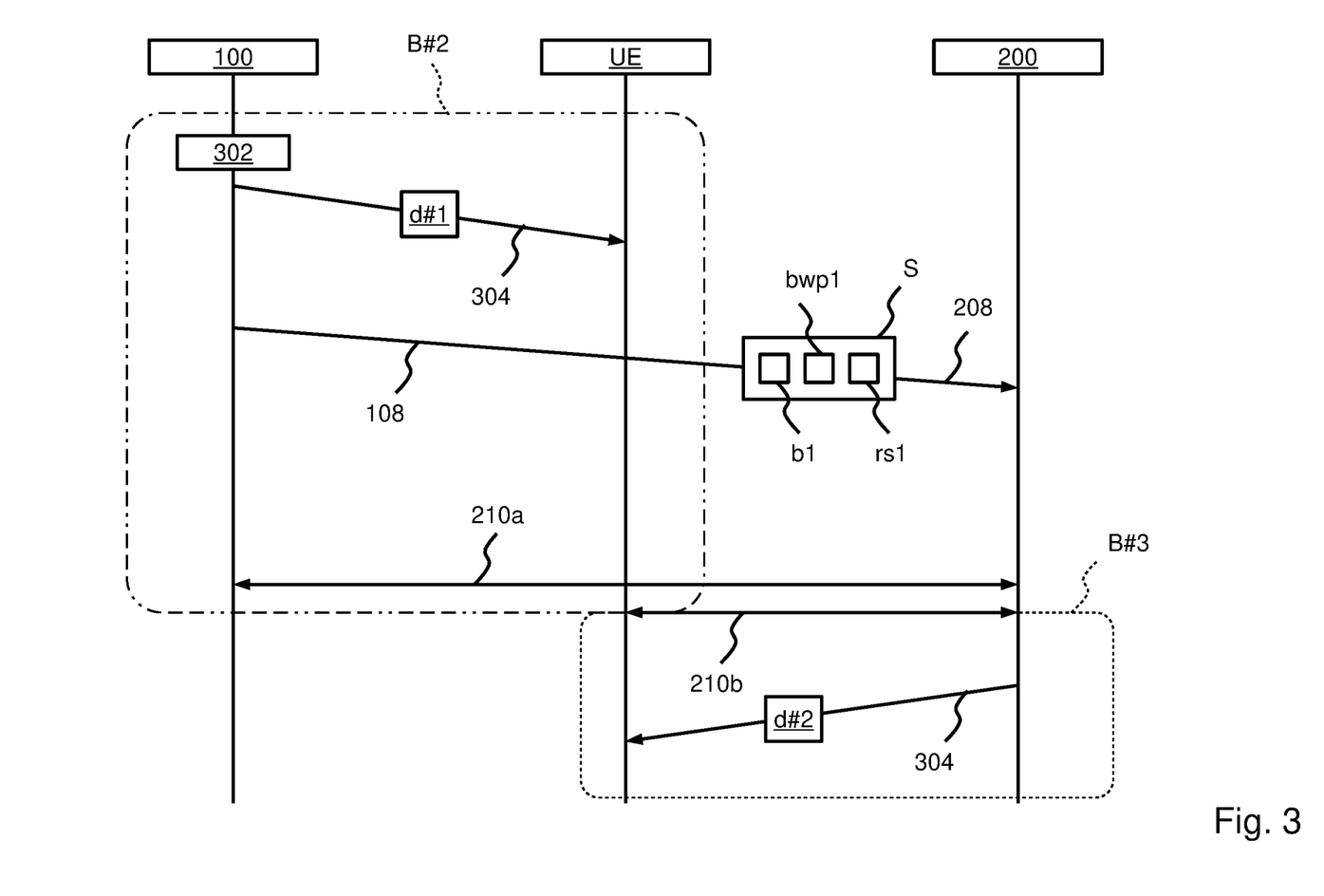

FIGS. 3 schematically depicts a sequence diagram to operate the first and second apparatus 100, 200 in a cell. According to a processing module or determination means 302, the first apparatus 100 determines or receives downlink data 01, which is transmitted via a processing module or transmitting means 304 to the UE. The UE is served by the first apparatus 100 via the beam B#2 of FIG. 2.

After receiving the set S, via the processing module or receiving means 208, the second apparatus 200 initiates a handover of the UE from the first to the second apparatus. According to a communication scheme 210a, the second apparatus 200 negotiates the hand-over with the first apparatus 100. According to the communication scheme 210b, the second apparatus 210 begins to serve the UE via the beam B#3 of FIG. 2. For example, second downlink data d#2 is transmitted via a processing module of transmitting means 304 to the UE.

Figure 4:
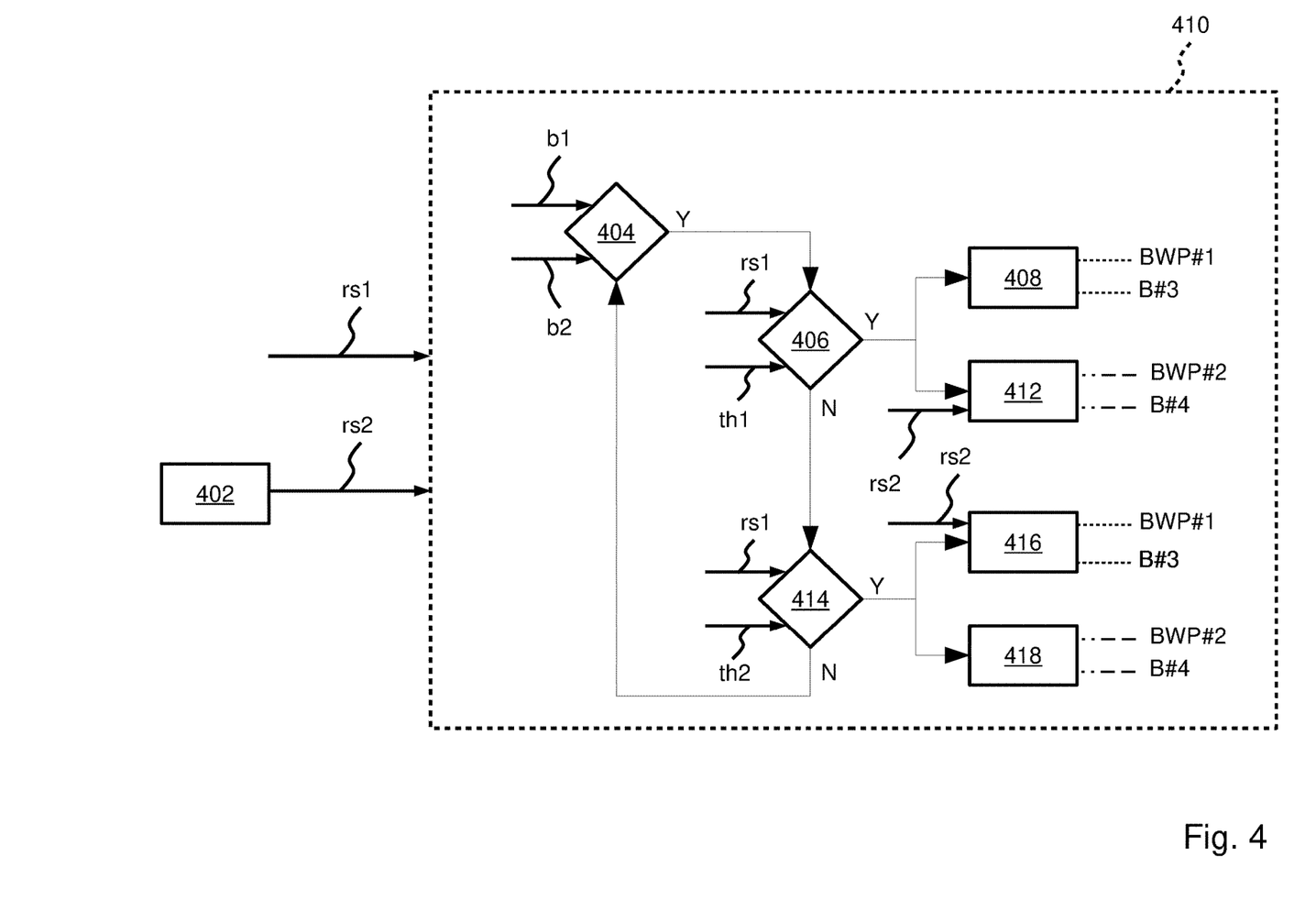
FIG. 4 schematically depicts a block diagram to operate the second apparatus.

FIG. 4 schematically depicts a block diagram to operate the second apparatus in order to provide intra-cell load balancing.

The second apparatus comprises a processing module or determining means 402 to determine a second resource status indicator rs2 that indicates at least one status of second radio resources, which are operated by the second apparatus 200. Said second radio resources are associated with a second radio beam B#3 and associated with the at least one first bandwidth part BWP#1. The at least one second radio beam B#3 and the at least one first bandwidth part BWP#1 are operated by the second apparatus.

The second apparatus comprises a processing module or managing means 410 for managing the second radio resources being operated by the second apparatus 200 in dependence on the received first resource status indicator rs1 and in dependence on the determined second resource status indicator rs2.

The first and second resource indicators rs1, rs2 are based or comprise measurements. For example, UEs provide the measurements or a part thereof. In another example, a scheduler provides the measurements or a part thereof.

The second apparatus comprises a processing module or determining means 404 to determine a spatial overlap between at least one first beam B#1, which is identified via the received first beam indicator b1, and the at least one second and/or at least one third radio beam B#3, B#4, which is operated by the second apparatus 200. The spatial overlap is determined in dependence on the first beam indicator b1 and the in dependence on a second beam indicator b2 indicating the second or third radio beam B#3, B#4. The managing means 410 are configured to manage the second radio resources being operated by the second apparatus 200 in dependence on the determined spatial overlap.

The second apparatus comprises a processing module or determining means 406 to determine a high congestion situation in the spatial overlap for the at least one first bandwidth part BWP#1 indicated by the first bandwidth part indicator bwp1 in dependence on the received first resource status indicator rs1 and in dependence on a high congestion threshold th1. In response to the determined high congestion situation, a processing module or de-allocating means 408 de-allocates at least a part of the second radio resources that are associated with the first bandwidth part BWP#1 and associated with the at least one second radio beam B#3, which is subject to the determined spatial overlap.

A processing module or allocating means 412 allocates third radio resources, which are operated by the second apparatus 200, in dependence on the high congestion situation, wherein the third radio resources are associated with the at least third radio beam B#4 and associated with a second bandwidth part BWP#2 operated by the second apparatus, if the second resource status indicator rs2 indicates free radio resources in the second bandwidth part BWP#2.

A processing module or determining means 414 determines a low congestion situation in the determined spatial overlap for the first bandwidth part BWP#1 indicated by the first bandwidth part indicator bwp1 in dependence on the received first resource status indicator rs1 and in dependence on a low congestion threshold th2. A processing module or allocating means 416 allocates at least a part of the second radio resources that are associated with the first bandwidth part BWP#1 and associated with the at least one second radio beam #B3, which is subject to the determined spatial overlap, if the second resource status indicator rs2 indicates free radio resources.

A processing module or de-allocating means 418 de-allocates/frees fourth radio resources, which are operated by the second apparatus 200, in dependence on the low congestion situation, wherein the fourth radio resources are associated with the at least one third radio beam B#4 and associated with a second bandwidth part BWP#2 operated by the second apparatus.

Figure 5:
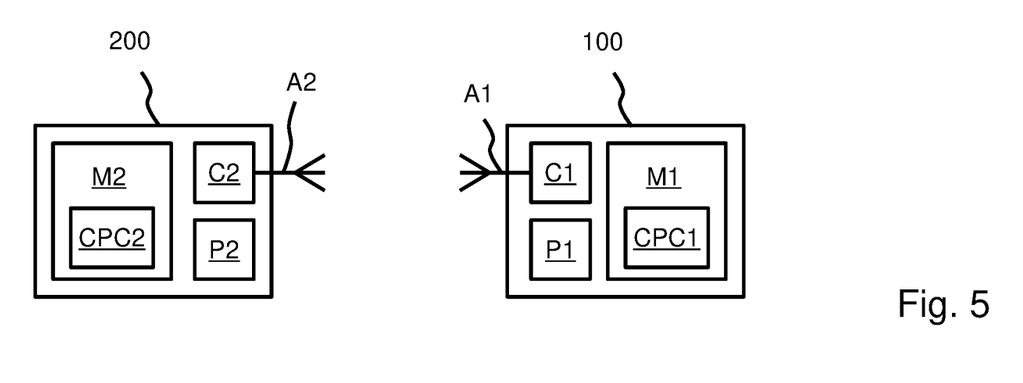
FIG. 5 schematically depicts the structure of the first and second apparatus.

FIG. 5 schematically depicts the communications network with the first apparatus 100 comprising at least one processor P1, at least one memory M1 including computer program code CPC1, and at least one communication module C1 that is coupled with at least one antenna A1. The at least one memory M1 and computer program code CPC1 are configured, with the at least one processor P1, and the at least one communication module or communication means C1, to cause the first apparatus 100 at least to operate according to the present description. The second apparatus 200 comprises at least one processor P2, at least one memory M2 including computer program code CPC2, and at least one communication module or communication means C2 that is coupled with at least one antenna A2. The at least one memory M2 and computer program code CPC2 are configured, with the at least one processor P2, and the at least one communication module C2, to cause the second apparatus 200 at least to operate according to the present description.

Certain abbreviations that may be found in the description and/or in the figures are herewith defined as follows:
 ARFCN absolute radio-frequency channel number
BA Bandwidth Adaptation
 BWP Bandwidth Part
 CD-SSB Cell Defining SSB
CGI Cell Global Identity
 eNB evolved Node B
 gNB g Node B
ID Identifier
 LTE Long Term Evolution
 NG-RAN Next Generation Radio Access Network
NR New Radio
 PCI Physical Cell Identifier
RAN Radio Access Network
 RANAC RAN Area Code
RMSI Remaining Minimum System Information
 RRC Radio Resource Control
 SSB SS/PBCH block, Synchronization Signal Block
TAC Tracking Area Code
 TNL Transport Network Layer
UE User Equipment Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method to operate a first apparatus comprising:
   determining a beam indicator that indicates at least one radio beam;
   determining a bandwidth part indicator that indicates at least one bandwidth part;
   determining a resource status indicator that indicates at least one status of radio resources, that are associated with the at least one radio beam and associated with the at least one bandwidth part; and
   transmitting at least one resource status set comprising the determined beam indicator, the determined bandwidth part indicator and the determined resource status indicator,
   wherein the beam indicator comprises a Synchronization Signal Block index,
   wherein the bandwidth part indicator comprises:
   an information about the location of the bandwidth part in frequency,
   a bandwidth part identifier per cell,
   a Physical Cell Identifier, and
   at least one or more Absolute Radio-Frequency Channel Number.

2. A method to operate a second apparatus comprising:
   receiving at least one resource status set comprising a first beam indicator, a first bandwidth part indicator, and a first resource status indicator; and
   managing second radio resources being operated by the second apparatus in dependence on the received at least one resource status set,
   the method further comprising:
   determining a second resource status indicator that indicates at least one status of second radio resources, which are operated by the second apparatus, wherein said second radio resources are associated with a second radio beam and associated with the at least one first bandwidth part, wherein the at least one second radio beam and the at least one first bandwidth part are operated by the second apparatus; and
   managing the second radio resources being operated by the second apparatus in dependence on the received first resource status indicator and in dependence on the determined second resource status indicator.

3. The method according to claim 2, wherein the first beam indicator comprises a Synchronization Signal Block, SSB, index.

4. The method according to claim 2, wherein the bandwidth part indicator comprises at least one of:
   an information about the location of the bandwidth part in frequency,
   a bandwidth part identifier per cell,
   a Physical Cell Identifier, and
   at least one or more Absolute Radio-Frequency Channel Number.

5. The method according to claim 2, further comprising:
   determining a spatial overlap between at least one first beam, which is identified via the received first beam indicator, and the at least one second radio beam and/or at least one third radio beam, which is operated by the second apparatus;
   managing the second radio resources being operated by the second apparatus in dependence on the determined spatial overlap.

6. The method according to claim 5, further comprising:
   determining a high congestion situation in the spatial overlap for the at least one first bandwidth part indicated by the first bandwidth part indicator;
   de-allocating at least a part of the second radio resources that are associated with the first bandwidth part and associated with the at least one second radio beam, which is subject to the determined spatial overlap.

7. The method according to claim 6, further comprising:
   allocating third radio resources, which are operated by the second apparatus, in dependence on the high congestion situation, wherein the third radio resources are associated with the at least third radio beam and associated with a second bandwidth part operated by the second apparatus.

8. The method according to claim 5, further comprising:
   determining a low congestion situation in the determined spatial overlap for the first bandwidth part indicated by the first bandwidth part indicator;
   allocating at least a part of the second radio resources that are associated with the first bandwidth part and associated with the at least one second radio beam, which is subject to the determined spatial overlap.

9. The method according to claim 8, further comprising:
   de-allocating fourth radio resources, which are operated by the second apparatus, in dependence on the low congestion situation, wherein the fourth radio resources are associated with the at least one third radio beam and associated with a second bandwidth part operated by the second apparatus.

10. A first apparatus comprising:
    at least one processor;
    at least one memory including computer program code; and
    at least one communication module, the at least one memory and the computer program code configured, with the at least one processor and the at least one communication module, to cause the first apparatus to:
    determine a beam indicator that indicates at least one radio beam,
    determine a bandwidth part indicator that indicates at least one bandwidth part,
    determine a resource status indicator that indicates at least one status of radio resources, that are associated with the at least one radio beam and associated with the at least one bandwidth part, and
    transmit at least one resource status set comprising the determined beam indicator, the determined bandwidth part indicator and the determined resource status indicator,
    wherein the beam indicator comprises a Synchronization Signal Block index,
    wherein the bandwidth part indicator comprises:
    an information about the location of the bandwidth part in frequency,
    a bandwidth part identifier per cell,
    a Physical Cell Identifier, and
    at least one or more Absolute Radio-Frequency Channel Number.

11. A second apparatus comprising:
at least one processor;
at least one memory including computer program code; and
at least one communication module, the at least one memory and the computer program code configured, with the at least one processor and the at least one communication module, to cause the second apparatus to:
receive at least one resource status set comprising a first beam indicator, a first bandwidth part indicator, and a first resource status indicator, and
manage second radio resources being operated by the second apparatus in dependence on the received at least one resource status set,
the second apparatus further caused to:
determine a second resource status indicator that indicates at least one status of second radio resources, which are operated by the second apparatus, wherein said second radio resources are associated with a second radio beam and associated with the at least one first bandwidth part, wherein the at least one second radio beam and the at least one first bandwidth part are operated by the second apparatus; and
managing the second radio resources being operated by the second apparatus in dependence on the received first resource status indicator and in dependence on the determined second resource status indicator.

* * * * *